(12) United States Patent
Tsumaki et al.

(10) Patent No.: US 12,465,699 B2
(45) Date of Patent: Nov. 11, 2025

(54) BLOOD VESSEL VISUALIZATION MEMBER, BLOOD VESSEL VISUALIZATION DEVICE, BLOOD VESSEL PUNCTURE SYSTEM, AND BLOOD VESSEL VISUALIZATION SYSTEM

(71) Applicant: TERUMO KABUSHIKI KAISHA, Tokyo (JP)

(72) Inventors: Shota Tsumaki, Kai (JP); Takayuki Yokota, Chuo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/787,700

(22) Filed: Jul. 29, 2024

(65) Prior Publication Data

US 2024/0382698 A1   Nov. 21, 2024

Related U.S. Application Data

(63) Continuation of application No. PCT/JP2023/003491, filed on Feb. 3, 2023.

(30) Foreign Application Priority Data

Feb. 9, 2022   (JP) ................. 2022-018473

(51) Int. Cl.
  *A61M 5/42*   (2006.01)
  *G06T 7/00*   (2017.01)
  *H04N 23/21*  (2023.01)

(52) U.S. Cl.
  CPC ........... *A61M 5/427* (2013.01); *G06T 7/0016* (2013.01); *H04N 23/21* (2023.01); A61M 2205/3313 (2013.01); G06T 2207/10048 (2013.01); G06T 2207/30101 (2013.01)

(58) Field of Classification Search
  CPC .......... A61M 5/427; A61M 2205/3313; G06T 7/0016; G06T 2207/10048; G06T 2207/30101; G06T 7/0012; H04N 23/21; A61B 5/107; A61B 5/153; G01N 21/17
  See application file for complete search history.

(56) References Cited

U.S. PATENT DOCUMENTS

2016/0287814 A1\* 10/2016 McManus .............. A61B 90/30

FOREIGN PATENT DOCUMENTS

| JP | 2004-237051 A |   | 8/2004 |   |
|---|---|---|---|---|
| JP | 2008167792 A | * | 7/2008 |   |
| JP | 2015033585 A | * | 2/2015 | ........... A61B 5/6843 |

(Continued)

OTHER PUBLICATIONS

International Search Report and Written Opinion of the International Searching Authority with English language translations issued in the corresponding International Patent Application No. PCT/JP2023/003491, dated Apr. 18, 2023.

*Primary Examiner* — Sath V Perungavoor
*Assistant Examiner* — Tyler B Edwards
(74) *Attorney, Agent, or Firm* — Foley & Lardner LLP (57) ABSTRACT

A blood vessel visualization member for visualizing a blood vessel of a living body includes: a sheet body that is affixable to a surface of a site to be visualized, the sheet body including: a wavelength converter including a wavelength conversion material that converts near-infrared light into visible light, and an adhesive portion provided on the wavelength converter.

17 Claims, 5 Drawing Sheets

(56) References Cited

FOREIGN PATENT DOCUMENTS

| JP | 2017-064094 A | 4/2017 | |
|---|---|---|---|
| WO | WO-2016/182075 A1 | 11/2016 | |
| WO | WO-2019232414 A1 * | 12/2019 | ......... G01S 15/8929 |

* cited by examiner

BLOOD VESSEL VISUALIZATION MEMBER, BLOOD VESSEL VISUALIZATION DEVICE, BLOOD VESSEL PUNCTURE SYSTEM, AND BLOOD VESSEL VISUALIZATION SYSTEM

BACKGROUND

Technical Field

The present disclosure relates to a blood vessel visualization member, a blood vessel visualization device, a blood vessel puncture system, and a blood vessel visualization system.

Related Art

For example, JP 2017-64094 A discloses a vein visualization device. The vein visualization device includes an irradiation unit, an imaging unit, an image processing means, and a display unit. The irradiation unit irradiates a site to be punctured of a patient with near-infrared light. The imaging unit receives reflected light resulting from reflection of the near-infrared light emitted to the site to be punctured on the site to be punctured and acquires a captured image of the site to be punctured. The image processing means extracts a vein from the captured image. The display unit displays the image processed by the image processing means.

SUMMARY

The above-described vein visualization device requires a member that converts near-infrared light into an image, and thus, entails a problem of having a large and complicated configuration.

An object of the present disclosure is to solve the above problems.

(1) A first aspect of the present disclosure provides a blood vessel visualization member for visualizing a blood vessel of a living body, the blood vessel visualization member including a sheet body that is affixable to a surface of a site to be visualized, the sheet body including: a wavelength converter including a wavelength conversion material that converts near-infrared light into visible light; and an adhesive portion provided on the wavelength converter.

(2) In the blood vessel visualization member according to (1), it is preferable that the wavelength converter is formed in a sheet shape, and the adhesive portion is provided on a surface of the wavelength converter that faces in a thickness direction or a side surface of the wavelength converter.

(3) In the blood vessel visualization member according to (1) or (2), it is preferable that the sheet body is flexible.

(4) In the blood vessel visualization member according to any one of (1) to (3), it is preferable that the sheet body is provided with one or a plurality of cuts connected to an outer periphery of the sheet body.

(5) In the blood vessel visualization member according to any one of (1) to (4), it is preferable that the sheet body is configured to transmit a liquid or a gas in a thickness direction of the sheet body.

(6) In the blood vessel visualization member according to any one of (1) to (5), it is preferable that the sheet body has a puncture hole for puncturing the blood vessel with a medical device.

(7) In the blood vessel visualization member according to (6), it is preferable that the sheet body has a fragile portion extending from an outer periphery of the sheet body to the puncture hole.

(8) In the blood vessel visualization member according to any one of (1) to (7), it is preferable that the wavelength converter includes: a support layer formed into a sheet shape using a material not containing the wavelength conversion material; and a converter body laminated on the support layer and including a material containing the wavelength conversion material.

(9) In the blood vessel visualization member according to (8), it is preferable that the converter body is molded by being coated on a surface of the support layer.

(10) In the blood vessel visualization member according to any one of (1) to (7), it is preferable that the wavelength converter has a portion that is molded into a sheet shape with a material containing the wavelength conversion material.

(11) In the blood vessel visualization member according to any one of (1) to (10), it is preferable that the wavelength conversion material converts the near-infrared light having a wavelength of more than 700 nm and 2500 nm or less into the visible light having a wavelength of 400 nm or more and 700 nm or less.

(12) A second aspect of the present disclosure provides a blood vessel visualization device including: the blood vessel visualization member according to any one of (1) to (11); and an irradiation unit including a light source unit for irradiating a surface of the site to be visualized that is on a side opposite to the surface to which the blood vessel visualization member is affixed with the near-infrared light.

(13) In the blood vessel visualization device according to (12), it is preferable that the irradiation unit includes an irradiation support unit that supports the light source unit in a displaceable manner.

(14) A third aspect of the present disclosure provides a blood vessel puncture system including: the blood vessel visualization device according to (12) or (13); and a medical device that punctures the blood vessel.

(15) A fourth aspect of the present disclosure provides a blood vessel visualization system including: the blood vessel visualization device according to (12) or (13); a camera that captures a blood vessel image displayed on the blood vessel visualization member; and an image processing unit that analyzes an image captured by the camera.

According to certain embodiments of the present disclosure, the sheet body having the wavelength converter is affixed to the surface of the site to be visualized, whereby near-infrared light transmitted through the site to be visualized can be converted into visible light by the wavelength converter. Therefore, a visible blood vessel image can be displayed on the wavelength converter. That is, the blood vessel visualization member can display the blood vessel image on the site to be visualized without using a member that converts the near-infrared light into an image. Therefore, the blood vessel can be visualized with a compact and simple configuration.

In addition, the blood vessel visualization member is affixed to the surface of the site to be visualized, whereby the near-infrared light transmitted through the site to be visualized can be efficiently received by the wavelength converter.

Therefore, the blood vessel image can be more clearly displayed on the wavelength converter.

DETAILED DESCRIPTION

Figure 1:
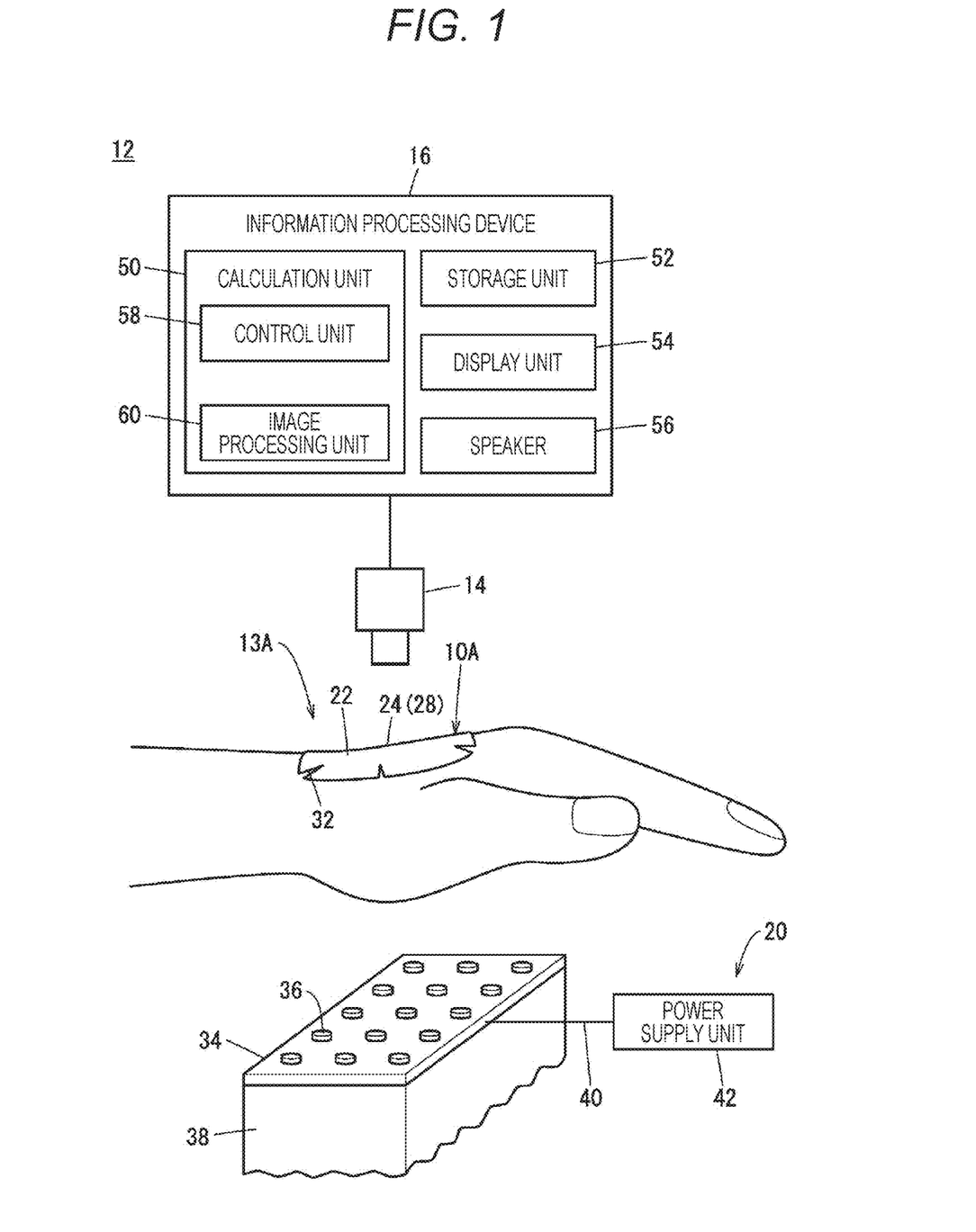
FIG. 1 is an explanatory diagram schematically illustrating a configuration of a blood vessel visualization system according to an embodiment of the present disclosure.

As illustrated in FIG. 1, a blood vessel visualization system 12 according to an embodiment of the present disclosure includes a blood vessel visualization device 13A, a camera 14, and an information processing device 16.

The blood vessel visualization device 13A visualizes a blood vessel 302 (see FIG. 3) in a site 300 to be visualized of a living body. In the present embodiment, the site 300 to be visualized is a human hand. Note that the site 300 to be visualized may be a region such as a forearm, an upper arm, a foot, a lower leg, or a thigh of a human body.

Figure 2A:
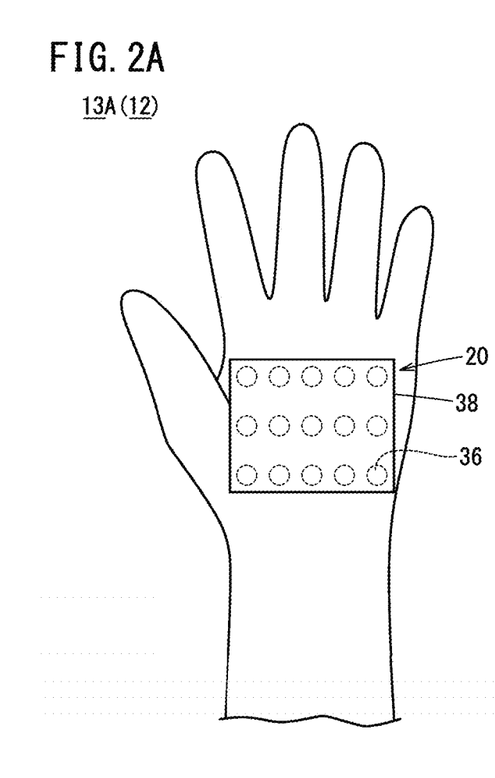
FIG. 2A is a bottom view of the blood vessel visualization device in FIG. 1.
Figure 2B:
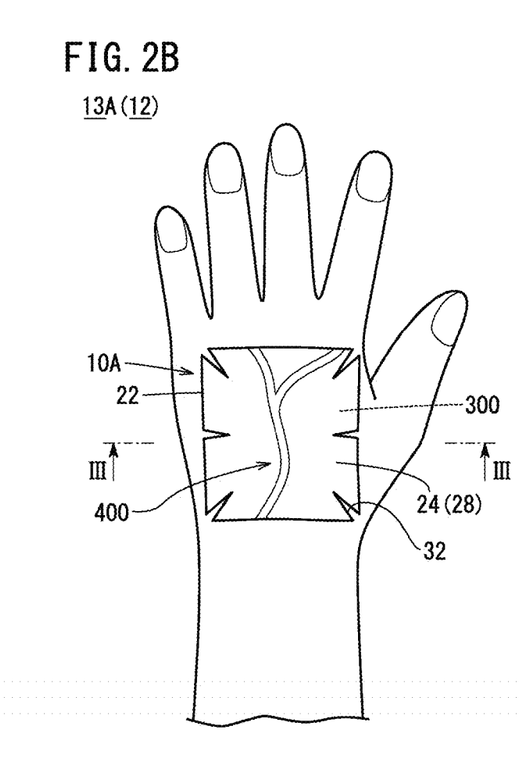
FIG. 2B is a plan view of the blood vessel visualization device in FIG. 1.
Figure 3:
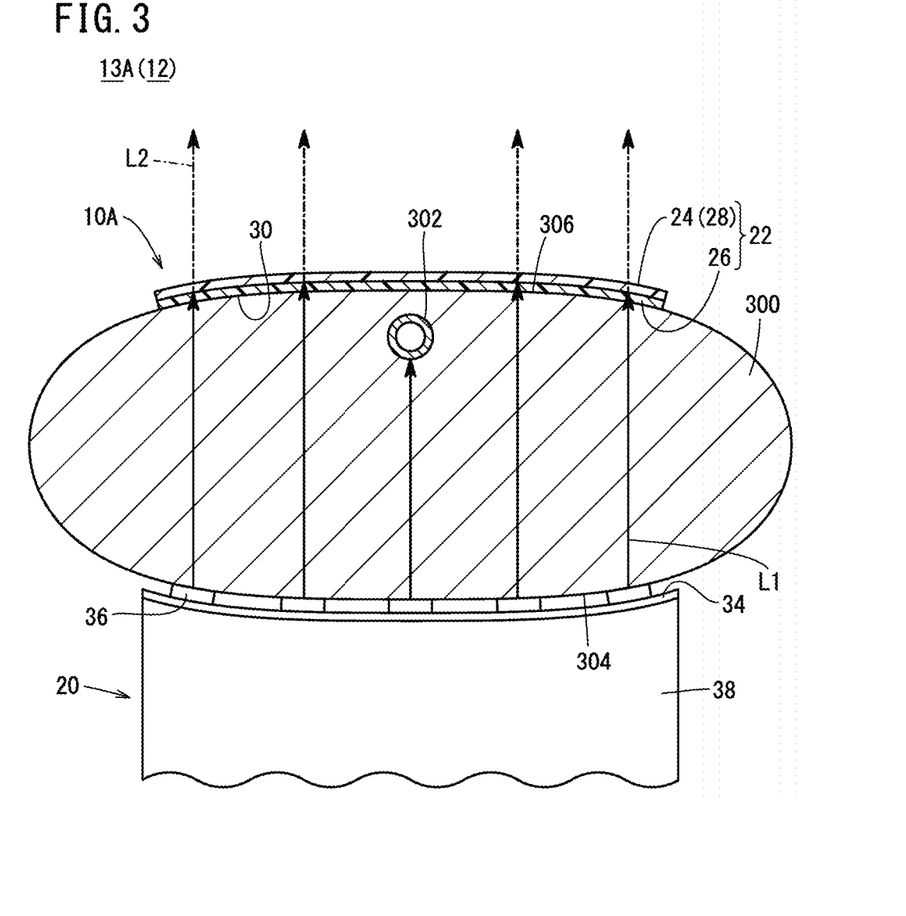
FIG. 3 is a cross-sectional view taken along line III-III in FIG. 2B.

In FIGS. 1 to 3, the blood vessel visualization device 13A includes a blood vessel visualization member 10A and an irradiation unit 20. The blood vessel visualization member 10A includes a sheet body 22 that can be affixed to the surface of a site 300 to be visualized. When the site 300 to be visualized is a human hand, the sheet body 22 is affixed to the back of the hand. The sheet body 22 is flexible so as to be able to follow the surface shape of the site 300 to be visualized.

As illustrated in FIG. 2B, the sheet body 22 is formed in a quadrangular shape when viewed from the thickness direction of the sheet body 22. The length of one side of the sheet body 22 is set to, for example, 20 mm or more and 300 mm or less. The thickness of the sheet body 22 is set to, for example, 0.1 mm or more and 0.5 mm or less. The sheet body 22 is configured to transmit both liquid and gas in the thickness direction of the sheet body 22.

Specifically, the sheet body 22 has a plurality of fine transmission holes (not illustrated) through which liquid and gas can pass. Note that the sheet body 22 may be configured to transmit liquid but inhibit transmission of gas in the thickness direction of the sheet body 22. Alternatively, the sheet body 22 may be configured to transmit gas but inhibit transmission of liquid in the thickness direction of the sheet body 22. The sheet body 22 only needs to be able to transmit liquid or gas in the thickness direction of the sheet body 22, and the above-described transmission holes are not necessary.

The shape and size of the sheet body 22 can be appropriately set. The sheet body 22 may be formed, for example, in a shape along the surface shape of the site 300 to be visualized when viewed from the thickness direction of the sheet body 22. Further, the sheet body 22 may be formed in a circular shape or a polygonal shape (other than a quadrangular shape) when viewed from the thickness direction of the sheet body 22.

In FIG. 3, the sheet body 22 includes a wavelength converter 24 and an adhesive portion 26. The wavelength converter 24 may be transparent or opaque. The wavelength converter 24 includes a wavelength conversion material 28 (light upconversion material) that converts near-infrared light L1 into visible light L2. The wavelength conversion material 28 converts the near-infrared light L1 having a wavelength of more than 700 nm and 2500 nm or less into the visible light L2 having a wavelength of 400 nm or more and 700 nm or less. The wavelength conversion material 28 includes, for example, an inorganic light-upconversion light emitter or an organic light-upconversion light emitter. The inorganic light-upconversion light emitter contains, for example, a rare earth element. The organic light-upconversion light emitter includes, for example, an organometallic complex or a polycyclic aromatic compound.

The wavelength converter 24 is molded into a sheet shape with a material containing the wavelength conversion material 28. Here, the "material containing the wavelength conversion material 28" includes a material containing only the wavelength conversion material 28 and a mixed material obtained by mixing another material with the wavelength conversion material 28. In the present embodiment, the wavelength converter 24 is molded into a sheet shape only with the wavelength conversion material 28, for example. However, the wavelength converter 24 may be molded into a sheet shape using a mixed material.

The adhesive portion 26 is provided in layers on a surface of the wavelength converter 24 in the thickness direction. The adhesive portion 26 is formed by applying an adhesive (tackiness agent) to the surface of the wavelength converter 24. Examples of the usable adhesives include an acrylic adhesive, a rubber (natural rubber, synthetic rubber) adhesive, a silicone adhesive, a urethane adhesive, and a vinyl ether adhesive. The adhesive portion 26 may be an adhesive sheet. The adhesive portion 26 may be transparent or opaque. The adhesive portion 26 transmits the near-infrared light L1.

The adhesive portion 26 is provided on the entire surface of the wavelength converter 24 that faces in the thickness direction. Note that the adhesive portion 26 may be provided only on a part of the surface of the wavelength converter 24. In this case, the adhesive portion 26 may be one continuous member or may have a plurality of members separated from each other.

An adhesive surface 30 of the adhesive portion 26 directed in a direction opposite to the wavelength converter 24 is provided with fine protrusions and recesses (not illustrated). This makes it easier to bring the adhesive surface 30 into direct contact with the site 300 to be visualized as compared with the case where the adhesive surface 30 is formed flat.

As illustrated in FIG. 2B, the sheet body 22 is provided with a plurality of cuts 32 connected to an outer periphery of the sheet body 22. In the present embodiment, the plurality of cuts 32 is formed at each corner of the sheet body 22 and a central part of each of two sides facing each other. Each of the cuts 32 is one continuous slit. The length of the cut 32 is set to, for example, 1 mm or more and 30 mm or less. The cuts 32 penetrate the sheet body 22 in the thickness direction.

The cuts 32 are not limited to the example of extending linearly, and may have a triangular shape, a semicircular shape, a quadrangular shape, or the like. The sheet body 22 may be provided with only one cut 32. The position, shape, size, and number of the cuts 32 may be appropriately changed. That is, the cut 32 may be provided on each side of the sheet body 22.

As illustrated in FIGS. 1, 2A, and 3, the irradiation unit 20 includes a substrate 34, a plurality of light source units 36, an irradiation support unit 38, a power supply line 40, and a power supply unit 42. The substrate 34 is flexible. The light source units 36 are mounted on the substrate 34.

Each of the light source units 36 emits near-infrared light L1 having a wavelength of more than 700 nm and 2500 nm or less. The light source units 36 are, for example, so-called chip light-emitting diodes. Note that the light source units 36 may be, for example, lamp light-emitting diodes or organic light-emitting diodes (OLEDs). The number, arrangement, size, and shape of the light source units 36 can be appropriately changed.

The irradiation support unit 38 supports the substrate 34 in a deformable manner. In other words, the irradiation support unit 38 supports the plurality of light source units 36 in a displaceable manner. The power supply line 40 supplies power of the power supply unit 42 to each of the light source units 36. The power supply line 40 connects the power supply unit 42 and the substrate 34 to each other. The power supply unit 42 is, for example, a primary cell or a secondary cell (battery). The irradiation unit 20 may be configured to wirelessly supply power from the power supply unit 42 to each of the light source units 36. In this case, the power supply line 40 is unnecessary.

As illustrated in FIG. 1, the camera 14 captures a later-described blood vessel image 400 to be displayed on the wavelength converter 24. The camera 14 transmits the captured image to the information processing device 16. The camera 14 is connected to the information processing device 16 by wire. The camera 14 may be wirelessly connected to the information processing device 16. Alternatively, the camera 14 may transmit the captured image to the information processing device 16 via an Internet line.

The information processing device 16 includes a calculation unit 50, a storage unit 52, a display unit 54, and a speaker 56. The calculation unit 50 is configured with a processor (processing circuit) such as a central processing unit (CPU) or a graphics processing unit (GPU).

The calculation unit 50 includes a control unit 58 and an image processing unit 60. The calculation unit 50 implements the control unit 58 and the image processing unit 60 by executing a program stored in the storage unit 52. Note that the calculation unit 50 may implement at least a part of the control unit 58 and the image processing unit 60 by an integrated circuit. Examples of the integrated circuit include an application specific integrated circuit (ASIC) and a field-programmable gate array (FPGA).

The storage unit 52 includes a volatile memory and a nonvolatile memory. Examples of the volatile memory include a random access memory (RAM). The volatile memory is used as a working memory of the processor, and temporarily stores data and the like necessary for processing or operation. Examples of the nonvolatile memory include a read only memory (ROM) and a flash memory. The nonvolatile memory is used as a storage memory. The nonvolatile memory stores programs, tables, maps, and the like. At least a part of the storage unit 52 may be incorporated in a processor or an integrated circuit as described above.

The control unit 58 controls the entire information processing device 16. The control unit 58 stores the image received from the camera 14 in the storage unit 52. The image processing unit 60 analyzes the image stored in the storage unit 52. Specifically, the image processing unit 60 extracts a change in images captured before and after a predetermined medical procedure, for example.

The display unit 54 displays an image received from the camera 14, an image analyzed by the image processing unit 60, and the like. The speaker 56 generates an alarm sound or the like.

Next, a method of using the blood vessel visualization system 12 will be described. The blood vessel visualization system 12 is used, for example, to detect a continuous or temporal change of the same blood vessel 302 at the site 300 to be visualized. Specifically, the blood vessel visualization system 12 is used, for example, to evaluate the effectiveness (effect of peripheral vasodilator and the like, effect of exercise therapy, and the like) of a medical procedure by comparing blood vessel images 400 of the blood vessel 302 that is a target before and after the medical procedure.

In the present embodiment, when the blood vessel visualization system 12 is used, the blood vessel visualization member 10A is affixed to the site 300 to be visualized (the back of the hand in FIG. 1 and the like) before the execution of a medical procedure. That is, the adhesive surface 30 of the sheet body 22 is affixed to the second surface 306 of the site 300 to be visualized. At this time, the sheet body 22, which is flexible, is deformed so as to follow the shape of the second surface 306 of the site 300 to be visualized. Further, the formation of wrinkles in the outer peripheral portion of the sheet body 22 can be suppressed by widening the cuts 32 of the sheet body 22.

Thereafter, the power supply unit 42 is turned on in a state in which the first surface 304 of the site 300 to be visualized is brought into contact (direct contact) with the light source units 36 of the irradiation unit 20. Thus, the near-infrared light L1 is emitted from the plurality of light source units 36 toward the first surface 304 of the site 300 to be visualized as illustrated in FIG. 3. The near-infrared light L1 passes through a region of the site 300 to be visualized other than the blood vessel 302. In other words, the near-infrared light L1 is absorbed by hemoglobin in the blood in the blood vessel 302 at the site 300 to be visualized. Transmitted light of the near-infrared light L1 transmitted through the site 300 to be visualized is converted into visible light L2 by the wavelength conversion material 28 of the wavelength converter 24. Therefore, a visible blood vessel image 400 is displayed on the wavelength converter 24 (see FIG. 2B).

Subsequently, the blood vessel image 400 displayed on the wavelength converter 24 is captured by the camera 14. The image (still image or moving image) captured by the camera 14 is transmitted to the information processing device 16 and stored in the storage unit 52. Hereinafter, an image captured before the execution of a medical procedure may be referred to as a "first image." The first image may be stored in a storage unit of another computer via the Internet instead of being stored in the storage unit 52 of the information processing device 16. The control unit 58 determines whether or not the blood vessel image 400 is normal on the basis of the first image, for example, and generates an alarm sound from the speaker 56 when the blood vessel image is abnormal (for example, when blood flow may be obstructed by stenosis).

Thereafter, for example, a medical procedure for the patient is performed. After the medical procedure is performed, the blood vessel image 400 displayed on the wavelength converter 24 is captured by the camera 14 by the same method as described above. The image of the blood vessel image 400 after the medical procedure captured by the camera 14 is transmitted to the information processing device 16 and stored in the storage unit 52. Hereinafter, an image captured after the execution of the medical procedure may be referred to as a "second image." The second image may be stored in a storage unit of another computer via the Internet instead of being stored in the storage unit 52 of the information processing device 16. The control unit 58 determines whether or not the blood vessel image 400 is normal on the basis of the second image, for example, and generates an alarm sound from the speaker 56 when the blood vessel image is abnormal (for example, when blood flow may be obstructed by stenosis).

Subsequently, the image processing unit 60 analyzes the first image and the second image to extract a changed portion between the first image and the second image. The control unit 58 displays the analysis result of the image processing unit 60 on the display unit 54. As a result, the user (including the patient) can easily and accurately know the effect of the medical procedure.

The present embodiment has the following effects.

According to the present embodiment, the near-infrared light L1 transmitted through the site 300 to be visualized can be converted into the visible light L2 by the wavelength converter 24 in a state in which the sheet body 22 having the wavelength converter 24 is affixed to the surface of the site 300 to be visualized. Thus, a visible blood vessel image 400 can be displayed on the wavelength converter 24. That is, the blood vessel visualization member 10A can display the blood vessel image 400 on the wavelength converter 24 located on the site 300 to be visualized without using a member that converts the near-infrared light L1 into an image. Therefore, the blood vessel 302 can be visualized with a compact and simple configuration.

In addition, the blood vessel visualization member 10A is affixed to the second surface 306 of the site 300 to be visualized, whereby the near-infrared light L1 transmitted through the site 300 to be visualized can be efficiently received by the wavelength converter 24. Therefore, the blood vessel image 400 can be more clearly displayed on the wavelength converter 24.

The wavelength converter 24 is formed into a sheet shape, and the adhesive portion 26 is provided on a surface of the wavelength converter 24 that faces in the thickness direction.

With this configuration, it is possible to suppress formation of a space between the surface of the wavelength converter 24 that faces in the thickness direction and the second surface 306 of the site 300 to be visualized.

The sheet body 22 is flexible.

With this configuration, the sheet body 22 can be deformed according to the shape of the second surface 306 of the site 300 to be visualized.

The sheet body 22 is provided with a plurality of cuts 32 connected to the outer periphery of the sheet body 22.

With this configuration, it is possible to suppress formation of wrinkles in the outer peripheral portion of the sheet body 22 when the sheet body 22 is affixed to the site 300 to be visualized.

The sheet body 22 is configured to transmit liquid or gas in the thickness direction of the sheet body 22.

With this configuration, the second surface 306 of the site 300 to be visualized can be suppressed from being stuffy by the sheet body 22.

The blood vessel visualization device 13A includes the irradiation unit 20 including the light source units 36 for irradiating the second surface 306 of the site 300 to be visualized with the near-infrared light L1.

With this configuration, the blood vessel image 400 can be displayed on the wavelength converter 24 by the blood vessel visualization device 13A.

The irradiation unit 20 includes the irradiation support unit 38 that supports the light source units 36 in a displaceable manner.

With this configuration, the light source units 36 can be easily brought into direct contact with the first surface 304 of the site 300 to be visualized.

The blood vessel visualization system 12 includes the camera 14 that captures the blood vessel image 400 displayed on the blood vessel visualization member 10A, and the image processing unit 60 that analyzes the image captured by the camera 14.

With this configuration, the blood vessel visualization system 12 can detect a change in the blood vessel image 400 on the wavelength converter 24.

Figure 4:
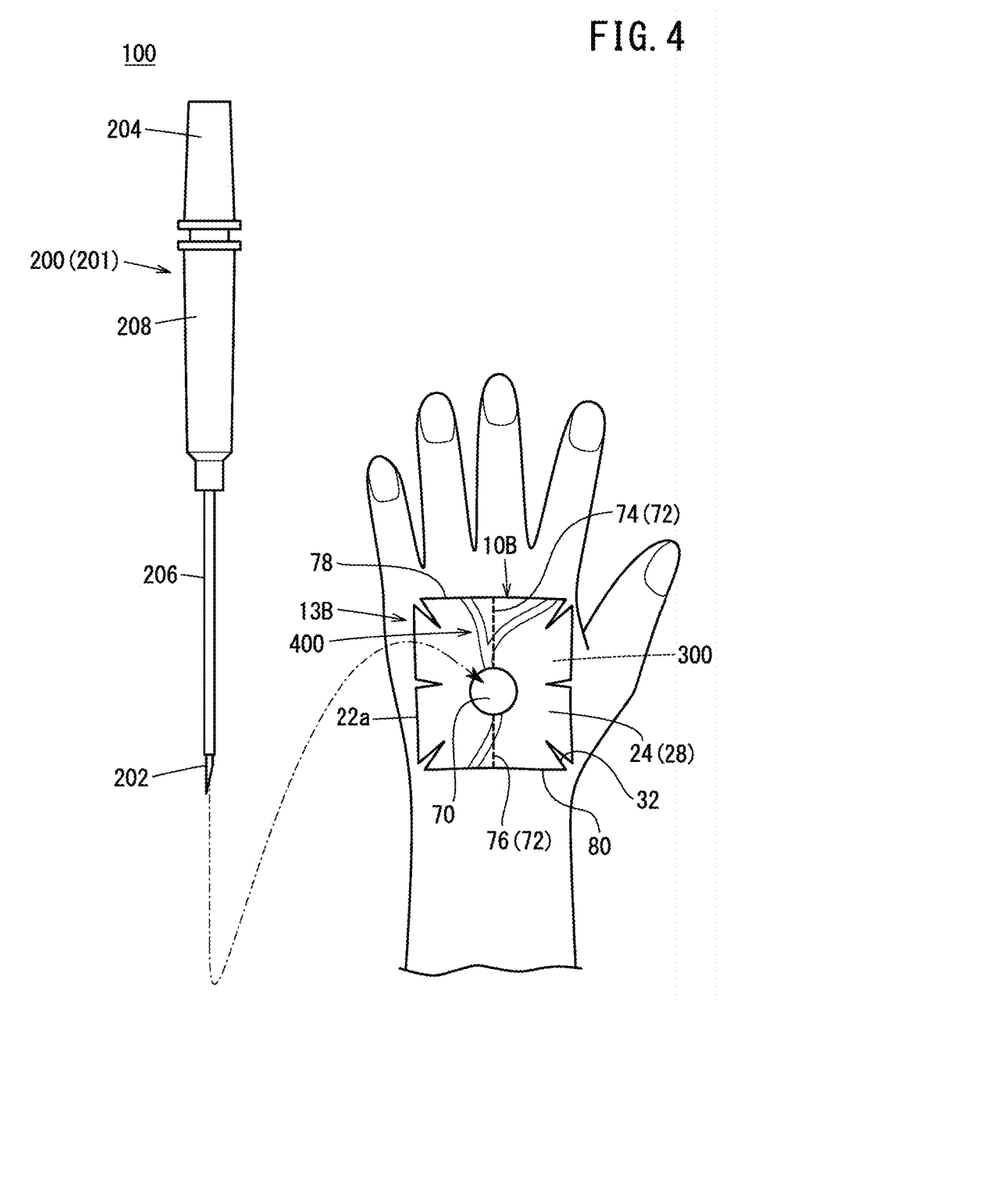
FIG. 4 is an explanatory diagram schematically illustrating a configuration of a blood vessel puncture system according to an embodiment of the present disclosure.

Next, a blood vessel puncture system 100 according to the present disclosure will be described. As illustrated in FIG. 4, the blood vessel puncture system 100 includes a blood vessel visualization device 13B and a medical device 200.

The blood vessel visualization device 13B includes a blood vessel visualization member 10B and the above-described irradiation unit 20 (see FIG. 1). A sheet body 22a of the blood vessel visualization member 10B further includes a puncture hole 70 and a fragile portion 72 as compared with the sheet body 22 of the blood vessel visualization member 10A described above.

The puncture hole 70 is a hole for puncturing the blood vessel 302 with the medical device 200. The puncture hole 70 is located at, for example, a position including a region where the blood vessel 302 (a radial artery, for example) to be punctured is assumed to be located in a state in which the blood vessel visualization member 10B is affixed to the site 300 to be visualized. Specifically, the puncture hole 70 is located, for example, at a central part of the sheet body 22a. In the present embodiment, the puncture hole 70 is a circular hole. The diameter of the puncture hole 70 is set to, for example, 1 mm or more and 10 mm or less. Note that the shape, position, and size of the puncture hole 70 can be appropriately set.

The fragile portion 72 extends from the outer periphery of the sheet body 22a to the puncture hole 70. The fragile portion 72 has a shape that is more easily broken than a portion of the sheet body 22a other than the fragile portion 72. The fragile portion 72 is, for example, a perforation. Note that the fragile portion 72 may be a groove that does not penetrate the sheet body 22a in the thickness direction. In this case, the fragile portion 72 is thinner than a portion of the sheet body 22a other than the fragile portion 72, and thus is easily broken (easily torn).

The fragile portion 72 has a first fragile line 74 and a second fragile line 76. The first fragile line 74 extends linearly from the central part of a first side 78 of the sheet body 22a to the puncture hole 70. The cut 32 is not provided in the first side 78. However, the first side 78 may be provided with the cut 32 at a position avoiding the first fragile line 74.

The second fragile line 76 extends linearly from the central part of a second side 80 of the sheet body 22a to the puncture hole 70. The puncture hole 70 is located between the first side 78 and the second side 80 of the sheet body 22a. The second fragile line 76 is located on an extension line of the first fragile line 74. The cut 32 is not provided in the second side 80. However, the second side 80 may be provided with the cut 32 at a position avoiding the second fragile line 76.

The medical device 200 is, for example, a catheter assembly 201. The catheter assembly 201 includes a needle body 202, a needle hub 204, a catheter shaft 206, and a catheter hub 208. The needle body 202 is configured to be capable of puncturing the blood vessel 302. The needle hub 204 is provided at a proximal end of the needle body 202. The catheter shaft 206 extends in a tubular shape. In an initial state, the needle body 202 is inserted into the lumen of the catheter shaft 206. The catheter hub 208 is provided at a proximal end of the catheter shaft 206. The medical device 200 is not limited to the catheter assembly 201, and may be a puncture needle for blood sampling or the like.

In this case, when the medical device 200 punctures the blood vessel 302 or the medical device 200 is placed in the site 300 to be visualized, the sheet body 22a can prevent the medical device 200 (for example, the catheter hub 208) from coming in direct contact with the second surface 306 of the site 300 to be visualized.

The sheet body 22a may have a plurality of puncture holes 70. In this case, the number and position of the puncture holes 70 can be appropriately set.

The blood vessel puncture system 100 has the following effects.

According to the blood vessel puncture system 100, the blood vessel 302 can be punctured with the medical device 200 (catheter assembly 201) with the blood vessel image 400 displayed on the wavelength converter 24 being visually recognized, so that the blood vessel 302 can be smoothly punctured with the medical device 200.

The wavelength converter 24 has the puncture hole 70 for puncturing the blood vessel 302 with the medical device 200.

With this configuration, the medical device 200 can puncture the blood vessel 302 through the puncture hole 70. As a result, the puncture resistance can be reduced as compared with a case of penetrating the medical device 200 through the sheet body 22a. In addition, it is possible to reduce the possibility that the sheet body 22a intrudes into the site 300 to be visualized as a foreign substance.

The sheet body 22a has the fragile portion 72 extending from the outer periphery of the sheet body 22a to the puncture hole 70.

With this configuration, the sheet body 22a can be easily removed from the site 300 to be visualized by breaking the fragile portion 72 after the medical device 200 punctures the blood vessel.

The blood vessel puncture system 100 may include the blood vessel visualization member 10A instead of the blood vessel visualization member 10B. Furthermore, the blood vessel puncture system 100 may include the camera 14 and the information processing device 16 described above.

Figure 5A:
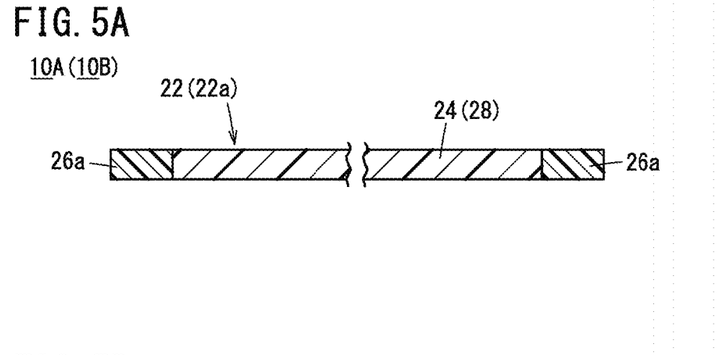
FIG. 5A is an explanatory cross-sectional view illustrating a blood vessel visualization member according to a first modification.

As illustrated in FIG. 5A, the sheet bodies 22 and 22a of the blood vessel visualization members 10A and 10B may include an adhesive portion 26a instead of the adhesive portion 26. The adhesive portion 26a is provided on a side surface of the wavelength converter 24. The adhesive portion 26a wraps around the wavelength converter 24. In addition, the adhesive portion 26a can be made of a material that does not transmit the near-infrared light L1. The sheet bodies 22 and 22a may include the adhesive portion 26a in addition to the adhesive portion 26.

Figure 5B:
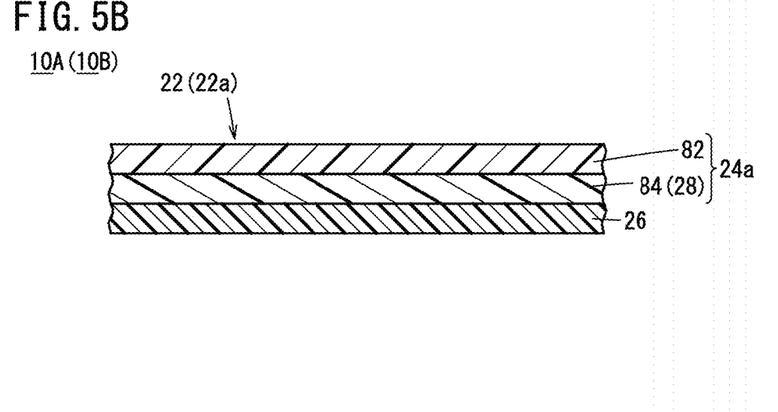
FIG. 5B is an explanatory cross-sectional view illustrating a blood vessel visualization member according to a second modification.

As illustrated in FIG. 5B, the sheet bodies 22 and 22a of the blood vessel visualization members 10A and 10B may include a wavelength converter 24a instead of the wavelength converter 24. The wavelength converter 24a includes a support layer 82 and a converter body 84. The support layer 82 is molded into a sheet shape with a material not containing the wavelength conversion material 28. The support layer 82 is flexible. The support layer 82 is made of a resin material capable of transmitting visible light L2.

The converter body 84 is laminated on the support layer 82. The converter body 84 is made of a material containing the wavelength conversion material 28. The converter body 84 is formed by being coated on the surface of the support layer 82. The adhesive portion 26 is provided on the converter body 84. That is, the converter body 84 is located between the support layer 82 and the adhesive portion 26. In the sheet bodies 22 and 22a, the adhesive portion 26a described above may be provided on the side surface of the wavelength converter 24a instead of the adhesive portion 26, or the adhesive portion 26a may be provided on the side surface of the wavelength converter 24a in addition to the adhesive portion 26.

In the wavelength converter 24a, the position of the support layer 82 and the position of the converter body 84 illustrated in FIG. 5B may be switched. That is, the support layer 82 may be located between the converter body 84 and the adhesive portion 26.

Figure 5C:
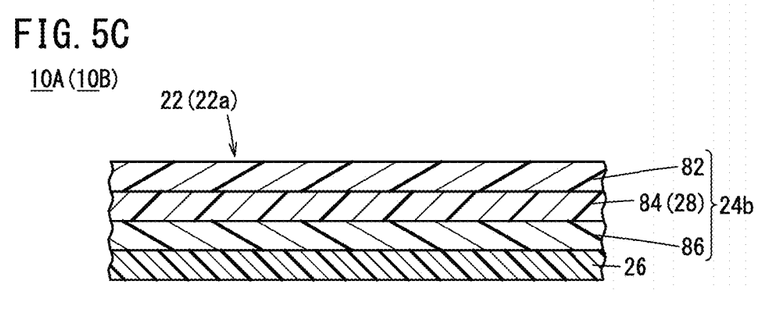
FIG. 5C is an explanatory cross-sectional view illustrating a blood vessel visualization member according to a third modification.

As illustrated in FIG. 5C, the sheet bodies 22 and 22a of the blood vessel visualization members 10A and 10B may include a wavelength converter 24b instead of the wavelength converter 24. The wavelength converter 24b includes a support layer 82, a converter body 84, and a reinforcement layer 86. The reinforcement layer 86 has a configuration similar to that of the support layer 82. The reinforcement layer 86 is laminated on a surface of the converter body 84 on a side opposite the support layer 82. That is, the converter body 84 is located between the support layer 82 and the reinforcement layer 86. When the sheet body 22a having such a configuration is used in the blood vessel puncture system 100, the reinforcement layer 86 can function as a cushion portion when the medical device 200 comes into contact with the sheet body 22a. In the wavelength converter 24b, the position of the support layer 82 and the position of the reinforcement layer 86 may be switched. That is, the support layer 82 may be located between the converter body 84 and the adhesive portion 26.

Note that the present invention is not limited to the above-described embodiment, and various configurations can be adopted without departing from the gist of the present invention.

What is claimed is:

1. A blood vessel visualization member for visualizing a blood vessel of a living body, the blood vessel visualization member comprising:
a sheet body that is affixable to a surface of a site to be visualized, the sheet body comprising:
a wavelength converter including a wavelength conversion material that converts near-infrared light into visible light, and
an adhesive portion provided on the wavelength converter.

2. The blood vessel visualization member according to claim 1, wherein:
the wavelength converter is formed in a sheet shape, and the adhesive portion is provided on a surface of the wavelength converter that faces in a thickness direction or a side surface of the wavelength converter.

3. The blood vessel visualization member according to claim 1, wherein:
the sheet body is flexible.

4. The blood vessel visualization member according to claim 1, wherein:
the sheet body has one or a plurality of cuts connected to an outer periphery of the sheet body.

5. The blood vessel visualization member according to claim 1, wherein:
the sheet body is configured to transmit a liquid or a gas in a thickness direction of the sheet body.

6. The blood vessel visualization member according to claim 1, wherein:
the sheet body has a puncture hole for puncturing the blood vessel with a medical device.

7. The blood vessel visualization member according to claim 6, wherein:
the sheet body has a fragile portion extending from an outer periphery of the sheet body to the puncture hole.

8. The blood vessel visualization member according to claim 1, wherein:
the wavelength converter comprises:
a support layer having a sheet shape and made of a material not containing the wavelength conversion material, and
a converter body laminated on the support layer and made of a material containing the wavelength conversion material.

9. The blood vessel visualization member according to claim 8, wherein:
the converter body is a coating on a surface of the support layer.

10. The blood vessel visualization member according to claim 1, wherein:
the wavelength converter has a portion that is molded into a sheet shape and made of a material containing the wavelength conversion material.

11. The blood vessel visualization member according to claim 1, wherein:
the wavelength conversion material converts the near-infrared light having a wavelength of more than 700 nm and 2500 nm or less into the visible light having a wavelength of 400 nm or more and 700 nm or less.

12. A blood vessel visualization device comprising:
a blood vessel visualization member for visualizing a blood vessel of a living body, the blood vessel visualization member comprising:
a sheet body that is disposed on a surface of a site to be visualized, the sheet body comprising:
a wavelength converter including a wavelength conversion material that converts near-infrared light into visible light, and
an irradiation unit comprising a light source unit for irradiating a surface of the site to be visualized that is on a side opposite to the surface to which the blood vessel visualization member is disposed with the near-infrared light.

13. The blood vessel visualization device according to claim 12, wherein:
the irradiation unit comprises an irradiation support unit that supports the light source unit in a displaceable manner.

14. A blood vessel puncture system comprising:
the blood vessel visualization device according to claim 12; and
a medical device that punctures the blood vessel.

15. A blood vessel visualization system comprising:
the blood vessel visualization device according to claim 12;
a camera that captures a blood vessel image displayed on the blood vessel visualization member; and
an image processing unit that analyzes an image captured by the camera.

16. A method of capturing a visible blood vessel image of a blood vessel in a site to be visualized that includes a first surface and a second surface on a side opposite the first surface, the method comprising:
providing a blood vessel visualization member comprising:
a sheet body comprising:
a wavelength converter including a wavelength conversion material that converts near-infrared light into visible light, and
an adhesive portion provided on the wavelength converter;
affixing the sheet body to the second surface of the site to be visualized;
emitting near-infrared light from an irradiation unit toward the first surface of the site to be visualized; and
capturing, by a camera, a visible blood vessel image that is displayed on the wavelength converter.

17. A method of detecting a change in a blood vessel of a patient, the method comprising:
performing the method of claim 16 a first time to capture a first visible blood vessel image;
performing a medical procedure on the patient;
performing the method of claim 16 a second time to capture a second visible blood vessel image; and
analyzing, using an image processing unit, the first visible blood vessel image and the second visible blood vessel image, to determine an effect of the medical procedure.

* * * * *